(12) United States Patent
Fountain

(10) Patent No.: US 7,946,127 B2
(45) Date of Patent: May 24, 2011

(54) APPARATUS AND METHOD FOR OPTIMIZING A LIQUEFIED NATURAL GAS FACILITY

(75) Inventor: Paul S. Fountain, Ventura, CA (US)

(73) Assignee: Honeywell International Inc., Morristown, NJ (US)

( * ) Notice: Subject to any disclaimer, the term of this patent is extended or adjusted under 35 U.S.C. 154(b) by 1128 days.

(21) Appl. No.: 11/708,957

(22) Filed: Feb. 21, 2007

(65) Prior Publication Data
US 2008/0202159 A1 Aug. 28, 2008

(51) Int. Cl.
*F25J 3/00* (2006.01)
(52) U.S. Cl. .......................... 62/612; 700/266; 700/282
(58) Field of Classification Search ............ 62/612
See application file for complete search history.

(56) References Cited

U.S. PATENT DOCUMENTS

| | | | |
|---|---|---|---|
| 3,420,748 A * | 1/1969 | Lupfer et al. ............ 203/1 |
| 3,763,358 A * | 10/1973 | Cargille ............... 708/442 |
| 3,763,658 A * | 10/1973 | Gaumer et al. ............ 62/612 |
| 4,685,522 A | 8/1987 | Dixon et al. |
| 6,272,882 B1 | 8/2001 | Hodges et al. |
| 6,434,435 B1 | 8/2002 | Tubel et al. |
| 6,454,002 B1 | 9/2002 | Stokes et al. |
| 6,793,712 B2 | 9/2004 | Qualls |
| 6,950,711 B2 * | 9/2005 | Havener et al. ............ 700/28 |
| 6,964,181 B1 | 11/2005 | Milios et al. |
| 2002/0165671 A1 | 11/2002 | Middya |
| 2004/0216514 A1 | 11/2004 | Nunnally et al. |
| 2004/0244415 A1 | 12/2004 | Paradowski |
| 2004/0255615 A1* | 12/2004 | Hupkes et al. ............ 62/606 |
| 2005/0252222 A1* | 11/2005 | Jessen et al. ............ 62/175 |
| 2005/0284176 A1 | 12/2005 | Eaton et al. |
| 2007/0012072 A1 | 1/2007 | Qualls et al. |
| 2007/0059838 A1* | 3/2007 | Morrison et al. ............ 436/55 |
| 2007/0227187 A1 | 10/2007 | Coward |

(Continued)

FOREIGN PATENT DOCUMENTS

WO WO 00/00715 A1 1/2000

(Continued)

OTHER PUBLICATIONS

"A Novel Approach Taking the Phillips Optimized Cascade LNG Process Into the Future," ConocoPhillips, AIChE 2003 Spring National Meeting, 29 pages.

(Continued)

*Primary Examiner* — Ljiljana (Lil) V Ciric
*Assistant Examiner* — Lukas Baldridge
(74) *Attorney, Agent, or Firm* — Munck Carter, LLP

(57) ABSTRACT

At least one model is associated with one or more manipulated variables and one or more controlled variables, which are associated with a cascade liquefied natural gas facility. Adjustments to the one or more manipulated variables are made using the at least one model to maintain the one or more controlled variables within defined limits. For example, a controlled variable may identify an overall load placed on multiple refrigeration systems in the facility. The one or more manipulated variables may be adjusted to increase the overall load placed on the refrigeration systems. The overall load can be determined by identifying a maximum of: a projected feed gas rate to operate a propane refrigeration system at maximum load, a projected feed gas rate to operate an ethylene or ethane refrigeration system at maximum load, and a projected feed gas rate to operate a methane refrigeration system at maximum load.

20 Claims, 4 Drawing Sheets

U.S. PATENT DOCUMENTS

2007/0275471 A1    11/2007    Coward

FOREIGN PATENT DOCUMENTS

WO    WO 2004/038535    5/2004
WO    WO 2004/070569    8/2004

OTHER PUBLICATIONS

Poster insert, Hydrocarbon Magazine, 2004, 1 page.
Atlantic LNG brochure, 2 pages.
B. Stenhouse, "Learnings on Sustainable Model-Based Optimisation—The Valhall Optimiser Field Trial", SPE International, Apr. 2006, 15 pages.
L. Saputelli, "Self-Learning Reservoir Management", Dec. 2005 SPE Reservoir Evaluation & Engineering, p. 534-547.
Miles R. Palke, "Nonlinear Optimization of Well Production Considering Gas Lift and Phase Behavior", Report to Department of Petroleum Engineering of Stanford University, Sep. 1996, 135 pages.
L.A. Saputelli, et al., "Promoting Real-Time Optimization of Hydrocarbon Producing Systems", SPE International, Sep. 2, 2003, p. 1-9.
K.K. Lo, "Optimum Lift-Gas Allocations Under Multiple Production Constraints", Society of Petroleum Engineers, Dec. 7, 1992, 23 pages.
Atlantic LNG brochure, 2 pages, prior to Dec. 28, 2007.

* cited by examiner

FIGURE 3A

APPARATUS AND METHOD FOR OPTIMIZING A LIQUEFIED NATURAL GAS FACILITY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to control systems and more specifically to an apparatus and method for optimizing the operation of a liquefied natural gas facility.

BACKGROUND

A liquefied natural gas facility typically converts feed gas into liquefied natural gas (LNG) and condensed natural gas liquids (NGL). A cascade liquefied natural gas facility typically includes multiple refrigeration units, which are used to progressively cool a natural gas feed to −161° C. Natural gas liquefies at this temperature with a 600:1 reduction in volume. This reduction in volume allows for economic shipping of the natural gas. As an example, a cascade liquefied natural gas facility could include a propane refrigeration system, an ethylene or ethane refrigeration system, and a methane refrigeration system. These refrigeration systems progressively cool the natural gas feed to produce liquefied natural gas, and the output of the ethylene or ethane refrigeration system can be processed to extract the natural gas liquids.

Control of a cascade liquefied natural gas facility is often difficult due to several factors. These factors include the large number of process variables that affect the operation of the facility, ever-changing ambient conditions, shifts in active process constraints, and changes in the composition of the feed gas. Under normal operating conditions, human operators typically make periodic adjustments to key operating variables of the facility. However, operators are often overwhelmed by the large number of process measurements being monitored, and they are often unable to keep up with the ever-changing operating conditions of the facility. As a result, the facility is often run at sub-optimal operation, resulting in a loss of production and a corresponding monetary loss.

SUMMARY

This disclosure provides an apparatus and method for optimizing the operation of a liquefied natural gas facility.

In a first embodiment, an apparatus includes an apparatus includes at least one memory operable to store at least one model. The at least one model is associated with one or more manipulated variables and one or more controlled variables. The one or more manipulated variables and the one or more controlled variables are associated with a cascade liquified natural gas facility. The apparatus also includes at least one processor operable to determine how to adjust the one or more manipulated variables using the at least one model so as to maintain the one or more controlled variables within defined limits.

In particular embodiments, one of the one or more controlled variables identifies an overall load placed on multiple refrigeration systems in the cascade liquified natural gas facility. Also, the at least one processor is operable to determine how to adjust the one or more manipulated variables so as to increase the overall load placed on the refrigeration systems. In more particular embodiments, the at least one processor is operable to determine the overall load by identifying a maximum of: (i) a projected feed gas rate to operate a propane refrigeration system at its maximum load, (ii) a projected feed gas rate to operate an ethylene or ethane refrigeration system at its maximum load, and (iii) a projected feed gas rate to operate a methane refrigeration system at its maximum load.

In other particular embodiments, the cascade liquified natural gas facility is operable to produce liquefied natural gas and natural gas liquids using raw feed gas. Also, the at least one processor is operable to determine how to adjust the one or more manipulated variables so as to maximize a processing rate of the raw feed gas and to maximize a yield of the liquefied natural gas and the natural gas liquids. In more particular embodiments, the at least one processor is operable to determine how to adjust the one or more manipulated variables using a linear program economic optimization or a quadratic program economic optimization.

In a second embodiment, a method includes determining how to adjust one or more manipulated variables using at least one model. The one or more manipulated variables and one or more controlled variables are associated with a cascade liquefied natural gas facility. The method also includes generating one or more control signals for the cascade liquefied natural gas facility. The one or more control signals adjust operation of the cascade liquefied natural gas facility so as to maintain the one or more controlled variables within defined limits.

In a third embodiment, a computer program is embodied on a computer readable medium and is operable to be executed by a processor. The computer program includes computer readable program code for determining how to adjust one or more manipulated variables using at least one model. The one or more manipulated variables and one or more controlled variables are associated with a cascade liquefied natural gas facility. The computer program also includes computer readable program code for generating one or more control signals for the cascade liquefied natural gas facility. The one or more control signals adjust operation of the cascade liquefied natural gas facility so as to maintain the one or more controlled variables within defined limits.

Other technical features may be readily apparent to one skilled in the art from the following figures, descriptions, and claims.

BRIEF DESCRIPTION OF THE DRAWINGS

For a more complete understanding of this, disclosure, reference is now made to the following description, taken in conjunction with the accompanying drawings, in which:

FIGS. 3A and 3B illustrate an example user interface for controlling a cascade liquefied natural gas facility.

DETAILED DESCRIPTION

Figure 1:
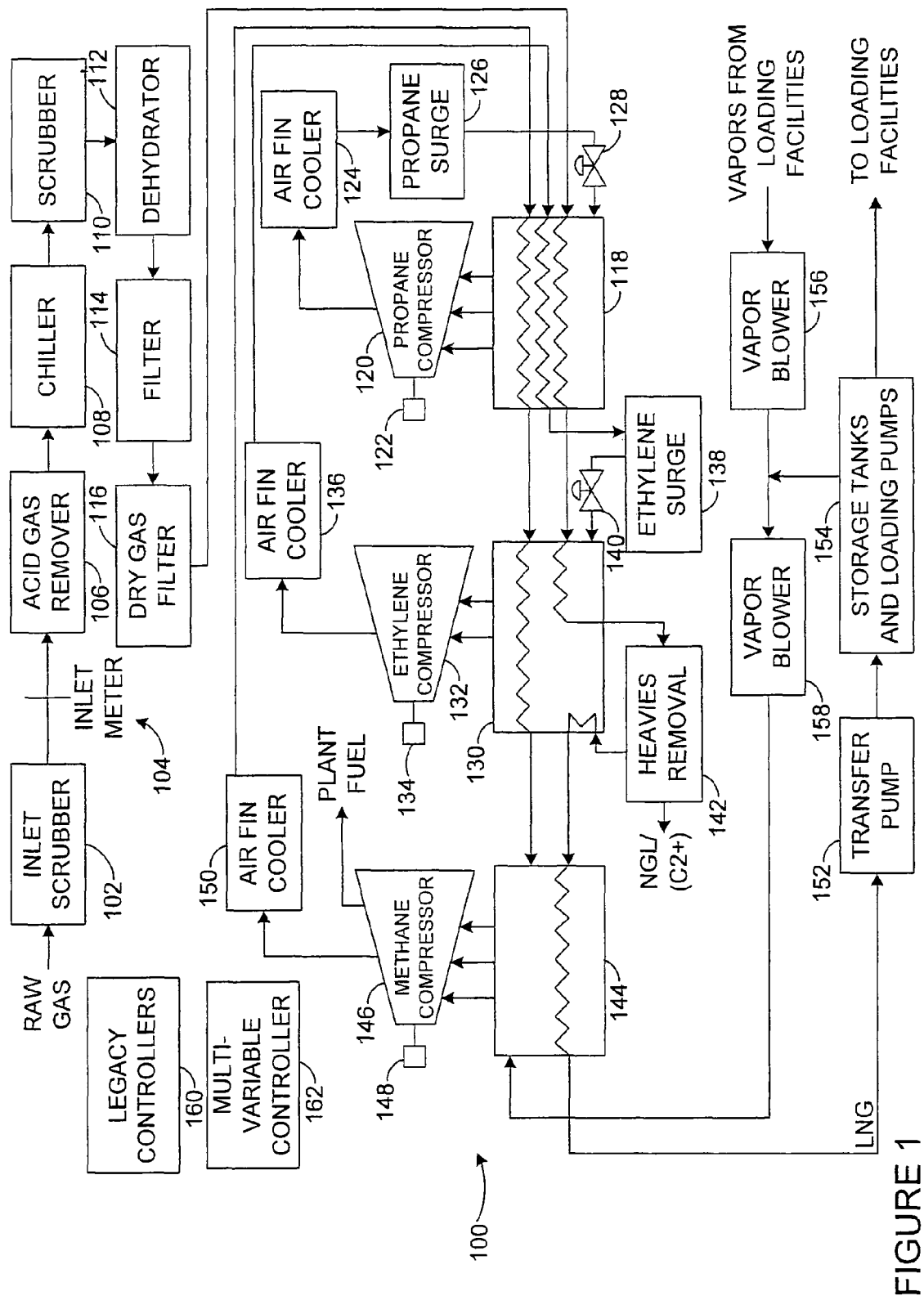
FIG. 1 illustrates an example cascade liquefied natural gas facility.

FIG. 1 illustrates an example cascade liquefied natural gas facility 100. The embodiment of the cascade liquefied natural gas facility 100 shown in FIG. 1 is for illustration only. Other embodiments of the cascade liquefied natural gas facility 100 may be used without departing from the scope of this disclosure.

In this example embodiment, the cascade liquefied natural gas facility 100 includes production equipment for processing raw feed gas (natural gas) to produce liquefied natural gas (LNG) and natural gas liquids (NGL). The production equipment shown in FIG. 1 represents one possible implementation of a cascade liquefied natural gas facility. Other types of cascade liquefied natural gas facilities having other or additional production equipment or having production equipment in a different configuration could also be used.

In this example, the raw feed gas is received at an inlet scrubber 102. The inlet scrubber 102 separates natural gas from water and liquid hydrocarbons contained in the raw feed gas. The inlet scrubber 102 represents any suitable structure for separating natural gas from liquid hydrocarbons or other liquids. The inlet scrubber 102 could, for example, represent an inlet slug catcher.

An inlet meter 104 receives the natural gas from the inlet scrubber 102. The inlet meter 104 measures the amount of natural gas entering the facility 100. This allows an operator of the facility 100 to measure the amount of natural gas received by the facility 100, which could be useful for billing, record-keeping, or other purposes. The inlet meter 104 represents any suitable structure for measuring natural gas.

An acid gas remover 106 receives the natural gas from the inlet meter 104 and removes acid gases from the natural gas. For example, the acid gas remover 106 may remove carbon dioxide and hydrogen sulphide from the natural gas. The acid gas remover 106 represents any suitable structure for removing carbon dioxide, hydrogen sulphide, or other or additional acid gases from natural gas. The acid gas remover 106 could, for example, represent a Diglycol Amine (DGA) sweetening unit.

The natural gas then enters a chiller 108. The chiller 108 cools the natural gas to facilitate water separation, such as by cooling the natural gas so that any remaining water in the natural gas condenses. The chiller 108 represents any suitable structure for cooling natural gas, such as a propane chilling unit.

The chilled natural gas is received at a scrubber 110. The scrubber 110 removes condensed water from the cooled natural gas. The condensed water may form as a result of the cooling process performed by the chiller 108. The scrubber 110 represents any suitable structure for removing condensed water from cooled natural gas.

A dehydrator 112 receives the chilled natural gas from the scrubber 110. The dehydrator 112 also removes water from the cooled natural gas. The dehydrator 112 represents any suitable structure for removing water from natural gas. For example, the dehydrator 112 could represent an absorber column with molecular sieve beds. In particular embodiments, three dehydrators 112 are used in the facility 100, where two dehydrators 112 are activated while the third dehydrator 112 is being regenerated or is in stand-by mode. During regeneration, hot dry gas can flow through a dehydrator 112 to drive off moisture absorbed from the natural gas.

The natural gas then flows through a filter 114, which removes mercury and mercury compounds from the natural gas. Mercury represents a contaminant that can interfere with other production equipment used later in the facility 100. The filter 114 represents any suitable structure for removing mercury or mercury compounds from natural gas, such as two mercury removal columns each packed with sulfur-impregnated carbon.

A dry gas filter 116 receives the filtered natural gas and removes particulate matter from the natural gas. For example, the dry gas filter 116 could remove particulate matter that is greater than a specified size, such as a specified number of microns. The dry gas filter 116 represents any suitable structure for filtering particulate or other matter from natural gas.

The natural gas is then processed in three refrigeration systems (propane, ethylene, and methane). These three refrigeration systems are used to cool the natural gas and produce liquefied natural gas and natural gas liquids. While described as using propane, ethylene, and methane refrigeration systems, any other or additional refrigeration systems could be used in the facility 100.

The first refrigeration system represents a propane refrigeration system formed from a heat exchanger 118, a propane compressor 120, a gas turbine 122, an air fin cooler 124, a propane surge tank 126, and a valve 128. The heat exchanger 118 cools various inputs using a propane refrigerant. In this example, the heat exchanger 118 cools the natural gas provided by the dry gas filter 116. The heat exchanger 118 also condenses discharge from one or more compressors in the ethylene refrigeration system. The heat exchanger 118 further de-superheats discharge from one or more compressors in the methane refrigeration system. The heat exchanger 118 represents any suitable structure for cooling one or more inputs using propane, such as a brazed aluminum and core-in-kettle exchanger.

The propane compressor 120 compresses the propane refrigerant after it is used by the heat exchanger 118. The propane compressor 120 represents any suitable structure for compressing propane. In some embodiments, multiple propane compressors 120 are used in the propane refrigeration system. In particular embodiments, two propane compressors 120 are operated at 50% capacity.

The gas turbine 122 provides operating power to the propane compressor 120. The gas turbine 122 could, for example, operate using natural gas and generate power for the propane compressor 120. The gas turbine 122 represents any suitable structure for generating power for one or more propane compressors 120.

The air fin cooler 124 cools and condenses the compressed propane. Among other things, this may help to remove heat and work energy added to the propane during the evaporation and compression steps. The air fin cooler 124 represents any suitable structure for cooling compressed propane.

The propane surge tank 126 stores liquid propane to be used by the heat exchanger 118. For example, the propane surge tank 126 may receive liquid propane from the air fin cooler 124 and store the liquid propane until needed by the heat exchanger 118. The propane surge tank 126 represents any suitable structure for storing liquid propane.

The valve 128 controls the flow of refrigerant (liquid propane) into the heat exchanger 118. For example, closing the valve 128 slows the flow of liquid propane into the heat exchanger 118, and the heat exchanger 118 provides less cooling for its inputs. Conversely, opening the valve 128 increases the flow of liquid propane into the heat exchanger 118, and the heat exchanger 118 provides more cooling for its inputs. The valve 128 represents any suitable structure controlling the flow of refrigerant into the heat exchanger 118.

The second refrigeration system represents an ethylene refrigeration system formed from a heat exchanger 130, an ethylene compressor 132, a gas turbine 134, an air fin cooler 136, an ethylene surge tank 138, and a valve 140. These components may operate in the same or similar manner as the corresponding components in the propane refrigeration system. In this example, the heat exchanger 130 cools its inputs using liquid ethylene as a refrigerant. Here, the heat exchanger 130 cools the natural gas provided by the dry gas filter 116 (after the natural gas is cooled by the heat exchanger 118). The heat exchanger 130 also cools the discharge from one or more compressors in the methane refrigeration system (after the discharge is cooled by the heat exchanger 118). The cooling of natural gas can be controlled to allow for controlled condensation of aromatics and heavy hydrocarbons, which are removed by a heavies removal unit 142. The heat exchanger 130 further cools the output of the heavies removal unit 142.

The ethylene compressor 132 compresses the ethylene refrigerant after it is used by the heat exchanger 130. The gas turbine 134 provides operating power to the ethylene compressor 132. The air fin cooler 136 cools and condenses the compressed ethylene and provides the condensed ethylene to the heat exchanger 118. The ethylene surge tank 138 stores liquid ethylene provided by the heat exchanger 118 and used by the heat exchanger 130. The valve 140 controls the flow of liquid ethylene into the heat exchanger 130.

The heavies removal unit 142 removes aromatics and heavy hydrocarbons from the natural gas coming from the ethylene refrigeration system. The heavies removal unit 142 then provides the aromatics and heavy hydrocarbons as an output and provides the remainder of the natural gas back to the heat exchanger 130, where the natural gas condenses to liquefied natural gas at high pressure. The heavies removal unit 142 represents any suitable structure for separating aromatics and heavy hydrocarbons from natural gas. The heavies removal unit 142 could, for example, represent a series of distillation or fractionation towers for separating natural gas liquids from the feed gas.

The third refrigeration system represents a methane refrigeration system formed from a heat exchanger 144, a methane compressor 146, a gas turbine 148, and an air fin cooler 150. These components may operate in the same or similar manner as the corresponding components in the other refrigeration systems. In this example, the heat exchanger 144 cools its inputs using liquid methane as a refrigerant. Here, the heat exchanger 144 cools the output of the heavies removal unit 142 (after it is cooled by the heat exchanger 130). As noted above, this output may represent liquefied natural gas at high pressure, and the heat exchanger 144 may reduce the liquefied natural gas to a lower pressure, such as by using expansion valves through three methane flash drums.

The methane compressor 146 compresses the methane refrigerant after it is used by the heat exchanger 144. The compressed methane can be used by the heat exchanger 144 or as plant fuel to supply power to various equipment in the facility 100. The gas turbine 148 provides operating power to the methane compressor 146. The air fin cooler 150 cools and condenses the compressed methane and provides the condensed methane to the heat exchanger 118.

In particular embodiments, the components of the ethylene and methane refrigeration systems are housed within cold boxes. Also, in other embodiments, the ethylene refrigeration system could be replaced by an ethane refrigeration system. Further, in particular embodiments, each of the propane and ethylene refrigeration systems could be a closed-loop system with one or multiple stages, and the methane refrigeration system could be an open-loop or closed-loop system. In addition, the refrigeration systems could include additional components, such as a fuel gas draw in open-loop configuration to prevent inert gases from building up in the refrigerants or an inert rejection system integrated into feeds with high nitrogen or helium content.

An output of the heat exchanger 144 is liquefied natural gas, which is provided via one or more transfer pumps 152 to storage tanks and loading pumps 154. Each transfer pump 152 represents any suitable structure for pumping liquefied natural gas into a storage tank. Each storage tank represents any suitable structure for storing liquefied natural gas. Each loading pump represents any suitable structure for pumping liquefied natural gas to a loading facility, such as a facility containing a transport ship.

Vapors from the loading facility and vapors from the storage tanks and loading pumps 154 are blown back to the heat exchanger 144 for recapture using vapor blowers 156-158. Each of the vapor blowers 156-158 represents any suitable structure for directing natural gas vapors to the heat exchanger 144.

In this example, the facility 100 includes one or more legacy controllers 160. The legacy controllers 160 represent controllers used in the facility 100 to control various aspects of the facility's operations. For example, the legacy controllers 160 could control the opening and closing of various valves in the facility 100. The legacy controllers 160 could also control the flow rate of materials in different parts of the facility 100. The legacy controllers 160 could control any other or additional aspects of the facility's operation.

A multi-variable controller 162 controls the overall operation of the facility 100. The controller 162 may, for example, make automatic process adjustments to control and optimize the LNG production process. The controller 162 may read multiple process values including independent variables (manipulated and disturbance variables) and dependent variables (controlled variables). In general, the facility 100 is associated with various "process variables," which represent various aspects of the facility 100 (such as flow rate, temperature, pressure, or volume). The controller 162 may operate by attempting to maintain a "controlled variable" (CV) at or near a desired value or within a desired operating range. The controller 162 attempts to maintain the controlled variable by altering one or more "manipulated variables" (MVs), such as an opening of a valve or a speed of a turbine. A "disturbance variable" (DV) represents a process variable that affects a controlled variable, where the disturbance variable can be considered by the controller 162 when altering the manipulated variables but generally cannot be controlled by the controller 162 (such as ambient temperature). By controlling certain controlled variables, the controller 162 may optimize the production process performed by the facility 100.

The controller 162 may use one or more mathematical models of the process being controlled. The models relate the independent variables (manipulated and disturbance variables) to the dependent variables (controlled variables). The models can be developed during the design of the controller 162, such as by using step test data. The models are then used by the controller 162 to control the process when the controller 162 goes on-line or is activated. For example, the controller 162 may use the models to predict the future values of the controlled variables and to calculate and implement adjustments to the manipulated variables to maintain the controlled variables within their defined limits. The controller 162 may also use the models to keep the facility 100 running at maximum capacity and optimum conditions.

The proper selection of controlled, manipulated, and disturbance variables may be critical to the performance of the controller 162. Examples of these types of variables are provided below. In particular embodiments, at least some of the controlled variables represent a combination of two or more process inputs. This allows the throughput of the facility 100 to be maximized when all of the inputs to the combined controlled variable are maximized.

The controller 162 could operate at any suitable frequency in the facility 100. For example, the controller 162 could operate at a 30-second interval. During each interval, the controller 162 can be used to make automatic process adjustments to control and optimize the process.

The controller 162 includes any hardware, software, firmware, or combination thereof for controlling the facility 100. The controller 162 could, for example, include one or more processors and one or more memories storing data and instructions (such as models of the facility 100) used, generated, or collected by the processor(s). As a particular example, the controller 162 could represent a controller implemented using Robust Multivariable Predictive Control Technology (RMPCT). One example embodiment of the controller 162 is shown in FIG. 2, which is described below.

Although FIG. 1 illustrates one example of a cascade liquefied natural gas facility 100, various changes could be made to FIG. 1. For example, other or additional production equipment could be used in any suitable configuration or arrangement to produce liquefied natural gas. Also, while shown as including three refrigeration systems, the facility 100 could include any suitable number of refrigeration systems. Further, while shown as including both one or more legacy controllers 160 and a multi-variable controller 162, the functionality of the controllers could be combined or further subdivided. Beyond that, the functional division shown in FIG. 1 is for illustration only. Various components in FIG. 1 could be combined or omitted and additional components could be added according to particular needs. In addition, FIG. 1 illustrates one example operational environment in which the controller 162 could be used. The controller 162 could be used with any other suitable LNG facility.

Figure 2:
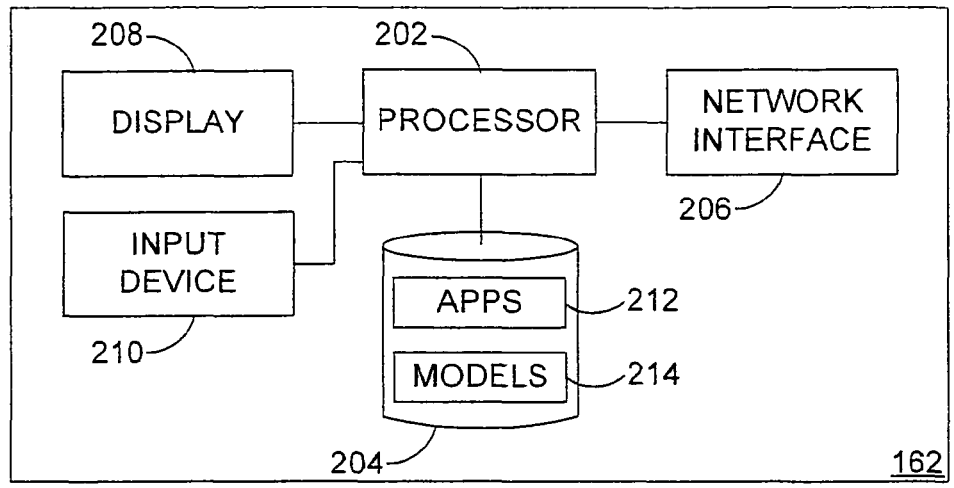
FIG. 2 illustrates an example multi-variable controller for a cascade liquefied natural gas facility.

FIG. 2 illustrates an example multi-variable controller 162 for a cascade liquefied natural gas facility. The embodiment of the controller 162 shown in FIG. 2 is for illustration only. Other embodiments of the controller 162 could be used without departing from the scope of this disclosure. Also, for ease of explanation, the controller 162 is described as being used in the facility 100 of FIG. 1. The controller 162 could be used in any other suitable facility or system.

In this example embodiment, the controller 162 includes a processor 202, a memory 204, a network interface 206, a display 208, and an input device 210. The processor 202 represents any suitable processing device, such as a microprocessor, digital signal processor, application-specific integrated circuit, or other logic device. The memory 204 represents any suitable volatile and/or non-volatile storage and retrieval device or devices, such as RAM or ROM. The network interface 206 represents any suitable interface for facilitating communication over a network, such as an Ethernet interface or other electrical signal line interface. The network interface 206 could, for example, receive measurement data identifying the current values of the controlled variables and output control signals for adjusting the manipulated variables. The display 208 represents any suitable display for presenting information to a user. The input device 210 represents any suitable device or devices for providing input to the processor 202, such as a keyboard or mouse.

In this example, the memory 204 includes one or more software applications 212 and one or more models 214. The one or more software applications 212 represent one or more computer programs defining how the controller 162 controls the facility 100. For example, the software applications 212 could use the models 214 to analyze input data (such as measurements of different controlled variables) to generate output signals (such as control signals for adjusting the manipulated variables).

The one or more models 214 define relationships between the manipulated and disturbance variables and the controlled variables. The models 214 are used by the controller 162 to control the facility 100. In particular embodiments, each model 214 could associate a single manipulated or disturbance variable to a single controlled variable.

As part of the control of the facility 100, the controller 162 could use the models 214 to make adjustments to manipulated variables so that controlled variables are maintained within specified limits. The controller 162 could also adjust the operation of the facility 100 so that certain process objectives are met. As an example, the process objectives could include, in order of priority, maximizing the processing rate of the feed gas, maximizing the yield of liquefied natural gas and natural gas liquids, and operating the process at optimal conditions.

As noted above, the proper selection of controlled, manipulated, and disturbance variables may be critical to the performance of the controller 162. In particular embodiments, the controller 162 may treat the variables identified in Table 1 as controlled variables, the variables identified in Table 2 as manipulated variables, and the variables identified in Table 3 as disturbance variables. The tables include, for each variable, an index number, tag name, description, and engineering units. The parenthetical "(new calc)" in Table 1 identifies a calculated controlled variable, or a controlled variable that is calculated using one or more other controlled variables. A description of how these controlled variables are calculated is presented after Table 3.

TABLE 1

| CV # | Tag | Description |
|---|---|---|
| 1 | CV01.PV (new calc) | Combined compressor loading of the three refrigeration systems |
| 2 | CV02.PV (new calc) | Total natural gas feed flow from the inlet meter 104 to the acid gas remover 106 |
| 3 | CV03.PV (new calc) | Valve position of a feed gas flow controller controlling the flow of natural gas from the inlet meter 104 to the acid gas remover 106 |
| 4 | CV04.PV (new calc) | Valve position of a feed gas flow controller controlling the flow of natural gas from the inlet meter 104 to the acid gas remover 106 |
| 5 | CV05.PV (inferred property) | NGL product from the heavies removal unit 142 C2/C3 (ethylene or ethane vs. propane) ratio product quality |
| 6 | CV06.PV | Differential pressure of a carbon dioxide absorber tower in the acid gas remover 106 |
| 7 | CV07.PV | Liquid level of a propane compressor suction knockout drum in the propane refrigeration system |
| 8 | CV08.PV | Liquid level of a propane compressor suction knockout drum in the propane refrigeration system |
| 9 | CV09.PV (new calc) | Valve position of a liquid level controller in the heat exchanger 118 in the propane refrigeration system |
| 10 | CV10.PV (new calc) | Valve position of a liquid level controller in the heat exchanger 118 in the propane refrigeration system |
| 11 | CV11.PV (new calc) | Pressure of a propane compressor outlet stream in the propane refrigeration system (maximum of several instrument readings) |
| 12 | CV12.PV (new calc) | Calculated water flow rate (loading) in the dehydrator 112 |
| 13 | CV13.PV (new calc) | Compressor approach to surge condition in the ethylene or ethane refrigeration system |
| 14 | CV14.PV (new calc) | Valve position of a high stage flash drum inlet pressure controller in the methane refrigeration system |
| 15 | CV15.PV (new calc) | High stage liquid heat exchanger differential pressure in the methane refrigeration system |
| 16 | CV16.PV | Flow rate of methane reflux for heavies removal in the heavies removal unit 142 |
| 17 | CV17.PV | Overhead pressure of a de-ethanizer distillation tower in the heavies removal unit 142 |

TABLE 1-continued

| CV # | Tag | Description |
|---|---|---|
| 18 | CV18.PV (new calc) | Valve position of a heavies removal distillation tower feed gas temperature controller in the heavies removal unit 142 |
| 19 | CV19.PV | Heavies removal distillation tower bottoms temperature in the heavies removal unit 142 |
| 20 | CV20.PV (new calc) | Valve position of a heavies removal distillation tower bottoms flow controller in the heavies removal unit 142 |
| 21 | CV21.PV (new calc) | Valve position of a methane wash distillation tower bottoms flow controller in the heavies removal unit 142 |
| 22 | CV22.PV (new calc) | Valve position of a de-ethanizer distillation tower reboiler temperature controller in the heavies removal unit 142 |
| 23 | CV23.PV (new calc) | Valve position of a de-ethahizer distillation tower reflux drum level controller in the heavies removal unit 142 |
| 24 | CV24.PV (new calc) | Heavies removal distillation tower overhead minus feed differential temperature in the heavies removal unit 142 |
| 25 | CV25.PV | Heavies removal distillation tower stripping gas heat exchanger differential temperature in the heavies removal unit 142 |
| 26 | CV26.PV | Low stage suction pressure of the propane compressor 120 in the propane refrigeration system |
| 27 | CV27.PV (new calc) | Compressor turbine temperature topping deviation from maximum in the propane refrigeration system |
| 28 | CV28.PV (new calc) | Low stage suction pressure of the ethylene/ethane compressor 132 in the ethylene/ethane refrigeration system |
| 29 | CV29.PV (new calc) | Compressor turbine temperature topping deviation from maximum in the ethylene/ethane refrigeration system |
| 30 | CV30.PV (new calc) | Compressor discharge pressue in the ethylene/ethane refrigeration system |
| 31 | CV31.PV | Compressor low stage suction temperature in the ethylene/ethane refrigeration system |
| 32 | CV32.PV (new calc) | compressor low stage suction pressure in the methane refrigeration system |
| | CV33.PV (new calc) | Compressor turbine temperature topping deviation from maximum in the methane refrigeration system |
| 34 | CV34.PV (new calc) | Compressor discharge pressure in the methane refrigeration system |
| | CV35.PV (new calc) | High stage flash drum pressure in the methane refrigeration system (compensated with available valve position) |
| 36 | CV36.PV (new calc) | De-ethanizer distillation tower reflux/feed flow ratio in the heavies removal unit 142 |
| 37 | CV37.PV | Methane wash distillation tower bottoms temperature in the heavies removal unit 142 |
| 38 | CV38.PV | Methane wash distillation tower overhead temperature in the heavies removal unit 142 |

TABLE 2

| MV # | Tag | Description |
|---|---|---|
| 1 | MV01.SP | Feed gas inlet pressure from the inlet meter 104 to the acid gas remover 106 |
| 2 | MV02.SP | High stage flash drum inlet pressure in the methane refrigeration system |
| 3 | MV03.SP | Valve position of a heavies removal distillation tower feed gas heat exchanger bypass in the heavies removal unit 142 |
| 4 | MV04.SP | Heavies removal distillation tower feed gas temperature in the heavies removal unit 142 |
| 5 | MV05.SP | Heavies removal distillation tower stripping gas flow rate in the heavies removal unit 142 |
| 6 | MV06.SP | De-ethanizer distillation tower reboiler temperature in the heavies removal unit 142 |
| 7 | MV07.OP | Valve position of a methane recycle flow controller in the methane refrigeration system |
| 8 | MV08.OP | Valve position of an ethylene or ethane compressor low stage suction temperature controller in the ethylene or ethane refrigeration system |

TABLE 3

| DV # | Tag | Description |
|---|---|---|
| 1 | DV01.PV | Gross heating value of the feed gas entering the acid gas remover 106 |

In Table 1, the value CV01.PV represents a controlled variable indicating the proximity of the overall compressor loading to its maximum. Individual compressor loadings may be projected or estimated to indicate the incremental feed that may load that individual compressor section. By determining a value for CV01.PV, this controlled variable can be pushed to its defined limit, thereby ensuring that all three refrigeration systems are at full capacity before restricting the overall production rate. This overall or combined controlled variable can also be used to project how much additional feed can be processed. In some embodiments, the value of CV01.PV can be determined as follows:

$$CV01.PV = \text{maximum}(A(1), A(2), A(3)).$$

Here, $A(n) = a(n) - 1*(\text{limit}(n) - \text{value}(n))$, where $A(n)$ represents the amount of additional feed that can be processed in refrigeration system $n$ up to its loading constraint. Also, $a(n)$ represents the gain or first derivative of the relationship between the loading constraint and throughput. Further, limit($n$) represents the upper or lower loading limit, and value($n$) represents the process value of the loading constraint (which could be determined using a direct process measurement or a calculation).

In particular embodiments, the value of CV01.PV could be determined as follows:

$$CV01.PV = \text{maximum}(CV27B, CV30B, CV35B).$$

Here, CV27B.PV represents a projected feed gas rate to operate the propane refrigeration system at its maximum load. CV30B.PV represents a projected feed gas rate to operate the ethylene or ethane refrigeration system at its maximum load. CV35B.PV represents a projected feed gas rate to operate the methane refrigeration system at its maximum load.

The value CV02.PV represents the total amount of natural gas entering the facility 100 in millions of standard cubic feet per hour (MMSCFH). It can be calculated as follows:

$$CV02.PV = 0.0372395*(FLOW1.PV + FLOW2.PV).$$

Here, the factor 0.0372395 converts between kilo-normal cubic meters per hour (kNm$^3$/hr) and millions of standard cubic feet per hour. Also, the values FLOW1.PV and FLOW2.PV represent the natural gas feed flow from the inlet meter 104 to the acid gas remover 106, where each value is associated with one of two different suppliers providing the natural gas. A different calculation could be used if a different number of suppliers are used.

The value CV15 provides a controlled variable that represents a differential pressure in the heat exchanger 144. It can be calculated as follows:

$$CV15 = \text{FILTER}(HSLDLHEDP.PV).$$

Here, HSLDLHEDP.PV represents the value of a high stage flash drum liquid heat exchanger differential pressure in the methane refrigeration system. The value may be filtered, such as by using a five-minute filter, to avoid unnecessary disturbances to the controller.

The value CV11 provides a single controlled variable that represents the higher discharge pressure of two propane compressors 120. This may be used as an indication of propane compressor loading. The value CV11 can be determined as follows:

$$CV11 = \text{maximum}(PDISCH1.PV, PDISCH2.PV).$$

Here, PDISCH1.PV and PDISCH2.PV represent the respective discharge pressures of the two propane compressors 120.

The value CV12 provides a controlled variable that represents the total load on each dehydrator 112 in service. The load may be calculated as the flow rate of water contained in the feed gas based on the feed gas flow rate and the solubility of water in the gas at the dehydrator temperature. The load could also be indicated by a process variable, such as flow rate, level, valve position, pressure, differential pressure, temperature, or combination thereof.

The value CV13 provides a single controlled variable that represents when any anti-surge valves in the ethylene or ethane compressors 132 open. When these valves open, operators typically put the valves in manual mode and limit the feed rate. The controller 162 may limit the feed rate based on how much a recycle valve with the greatest opening is beyond the controlled variable high limit. If the controlled variable high limit and the highest valve opening are equal, the feed may be limited (not reduced or increased) for this controlled variable. The value CV13 could be determined as follows:

$$CV13 = \text{maximum}(VALVLS1.PV, VALVLS2.PV, VALVHS1.PV, VALVHS2.PV).$$

Here, VALVLS1.PV, VALVLS2.PV, VALVHS1.PV, and VALVHS2.PV represent the low-stage and high-stage anti-surge valve positions in the ethylene or ethane refrigeration system. In particular embodiments, a CL program (CV13.CL shown in the Software Appendix) can be used to modify the gain multipliers for manipulated variables MV01 and MV02. The normal gain can be used when CV13.PV is within a "threshold" of the controlled variable high limit. When outside the threshold, the gain can be made smaller to prevent this controlled variable from artificially limiting the feed rate.

The value CV05 is used to infer the de-ethanizer bottoms C2/C3 ratio, a controller variable. C2 represents the concentration of ethane in the NGL stream (the de-ethanizer bottoms stream). C3 represents the concentration of propane in the NGL stream. The C2/C3 ratio may exhibit non-linear relationships to the process measurements. To provide a more accurate inferred property, the natural log (ln) of the C2/C3 ratio can be used. In particular embodiments, the ln(C2/C3) value can be calculated in a PROFIT SENSOR PRO toolkit that runs in an APP NODE WINDOWS environment from HONEYWELL INTERNATIONAL INC. The value of ln CV05 can be determined and then converted to the value of CV05. The value of ln CV05 can be determined as follows:

$$\ln CV05.PV = -0.657 * MV06.PV + 1.45 * CV17.PV + 34.85 + \text{Bias}.$$

Here, MV06.PV represents the de-ethanizer reboiler temperature, and CV17.PV represents the de-ethanizer reflux drum pressure. Also, Bias represents a numerical constant used to calibrate ln CV05 with laboratory measurements of the NGL product quality. The value of CV05.PV can then be determined as follows:

$$CV05.PV = \text{EXP}(\ln CV05.PV).$$

The value CV24 provides a controlled variable that shows the temperature difference in the heavies removal distillation tower in the heavies removal unit 142. It can be determined as follows:

$$CV24 = HRDTOT.PV - HRDTFT.PV.$$

Here, HRDTOT.PV represents the heavies removal distillation tower overhead temperature in the heavies removal unit 142, and HRDTFT represents the heavies removal distillation tower feed temperature in the heavies removal unit 142.

The value CV36.PV represents a controlled variable used to infer the de-ethanizer reflux-to-feed ratio so the controller 162 can maintain this ratio within an operating range for good separation. There may be no reflux flow indication, so the reflux flow can be inferred using RFVP.OP, the reflux flow valve position. The value CV36.PV can be determined as follows:

$$CV36.PV = 1.67 * RFVP.OP / (HRDTBFR.PV + MWDTBFR.PV).$$

Here, HRDTBFR.PV represents the heavies removal distillation tower bottoms flow rate in the heavies removal unit 142. Also, MWDTBFR.PV represents the methane wash distillation tower bottoms flow rate in the heavies removal unit 142.

The value CV35.PV provides a controlled variable used to prevent the high stage flash drum overhead pressure control from opening to flare. Since HSFDO.PV may be equal to its setpoint when flaring, compensation of the controlled variable may be required to operate with the constraint limit near the value of HSFDO.SP (its setpoint). Otherwise, slow control action may occur to bring HSFDO.PV back within limits. Because a Joule-Thomson (JT) control valve (associated with MV02) for controlling the high stage flash drum inlet pressure in the methane refrigeration system frequently operates at OP=105%, predictions of this controlled variable may become inaccurate when the setpoint is forced to unwind. To avoid this problem, the gain multiplier for the manipulated variable MV02 can be set to zero when MV02 is close to a windup condition. The value of CV35 can be determined as follows:

$$CV35 = HSFDO.PV + 0.1 * (HSFDO.OP - HSFDO.OP-LOLM).$$

Here, HSFDO.OP represents the high stage flash drum overheads in the methane refrigeration system, and HSFDO.OP-LOLM represents the low limit of the high stage flash drum overheads. In particular embodiments, a CL program (CV35.CL shown in the Software Appendix) may be used to improve the predictions of this controlled variable when the JT valve is wound up.

The value of CV35A represents a high limit for the calculation of the CV35B value. In particular embodiments, the value of CV35A could represent a static value, such as 18.8.

The value CV35B represents an input to the CV01 calculation. The value CV35B is used to project the amount of incremental feed that could be processed to bring the methane compressors' high stage flash drum pressure to its high limit. The value of CV35B can be determined as follows:

$$CV35B = (CV35A.PV - CV35.PV) / 0.0906.$$

The value 0.0906 represents the gain between CV35/CV02.

The value CV27 provides a single controlled variable that represents the higher exhaust temperature of the propane compressors 120. This may be used as an indication of propane compressor loading. The value of CV27 could be determined as follows:

$$CV27 = \text{maximum}(TLPC1.PV - AETPC1.PV, TLPC2.PV - AETPC2.PV).$$

Here, AETPC1.PV and AETPC2.PV represent the average exhaust temperature of two propane compressors 120, and TLPC1.PV and TLPC2.PV represent the topping limits of the propane compressors 120.

The value CV27B provides an input to the CV01 calculation. It is used to project the amount of incremental feed that could be processed to bring the propane compressors' topping temperature to its high limit. The value of CV27B could be determined as follows:

$$CV27B = CV27.PV/0.85.$$

Here, the value 0.85 represents the gain between CV27 and CV02.

The value CV28 provides a single controlled variable that represents the higher suction pressure of the ethylene or ethane compressors 132. This may be used as an indication of ethylene or ethane compressor loading. The value of CV28 could be determined as follows:

$$CV28 = \mathrm{maximum}(LSSPEC1.PV, LSSPEC2.PV).$$

Here, LSSPEC1.PV and LSSPEC2.PV represent the low stage suction pressures of two ethylene or ethane compressors 132.

The value CV29 provides a single controlled variable that represents the higher exhaust temperature of the ethylene or ethane compressors 132. This may be used as an indication of ethylene or ethane compressor loading. The value of CV29 can be determined as follows:

$$CV29 = \mathrm{maximum}(TLEC1.PV - AETEC1.PV, TLEC2.PV - AETEC2.PV).$$

Here, AETEC1.PV and AETEC2.PV represent the average exhaust temperature of two ethylene or ethane compressors 132, and TLEC1.PV and TLEC2.PV represent the topping limits of the ethylene or ethane compressors 132.

The value CV30 provides a single controlled variable that represents the higher discharge pressure of the ethylene or ethane compressors 132. This may be used as an indication of ethylene or ethane compressor loading.

The value of CV30 could be determined as:

$$CV30 = \mathrm{maximum}(HSSPEC1.PV, HSSPEC2.PV).$$

Here, HSSPEC1.PV and HSSPEC2.PV represent the high stage suction pressures of two ethylene or ethane compressors 132.

The value CV30A represents a high limit for the CV30 calculation. In particular embodiments, the value of CV30A could represent a fixed value, such as 24.2

The value CV30B represents an input to the CV01 calculation. The value CV30B is used to project the amount of incremental feed that could be processed to bring the ethylene or ethane compressors' discharge pressure to its high limit. The value of CV30B could be determined as follows:

$$CV30B = (CV30A.PV - CV30.PV)/0.0135.$$

Here, the value 0.0135 represents the gain between CV30 and CV02.

The value CV32 provides a single controlled variable that represents the higher suction pressure of the methane compressors 146. This may be used as an indication of methane compressor loading. The value of CV32 could be determined as follows:

$$CV32 = \mathrm{maximum}(LSSPMC1.PV, LSSPMC2.PV).$$

Here, LSSPMC1.PV and LSSPMC2.PV represent the low stage suction pressure of two methane compressors 146.

The value CV33 represents a single controlled variable that represents the higher exhaust temperature of the methane compressors 146. This can be used as an indication of methane compressor loading. The value of CV33 could be determined as:

$$CV33 = \mathrm{maximum}(TLMC1.PV - AETMC1.PV, TLMC2.PV - AETMC2.PV).$$

Here, AETMC1.PV and AETMC2.PV represent the average exhaust temperature of two methane compressors 146, and TLMC1.PV and TLMC2.PV represent the topping limits of the methane compressors 146.

The value CV34 provides a single controlled variable that represents the higher discharge pressure of the methane compressors 146. This can be used as an indication of methane compressor loading. The value of CV34 could be determined as:

$$CV34 = \mathrm{maximum}(MCL1.PV, MCL2.PV).$$

Here, MCL1.PV, MCL2.PV represent the different loadings of the two methane compressors 146.

Using the controlled, manipulated, and disturbance variables defined above in Tables 1 through 3, models 214 can be constructed of the facility 100. These models 214 could be generated, for example, using step-test data involving various production equipment in the facility 100. Tables 4 through 7 below identify example models 214 that could associate controlled variables to manipulated variables. No relationship (model defined as "Null") may exist between the controlled variables and the manipulated and disturbance variables. The models shown in Tables 4 through 7 are shown in Laplace Transform form.

TABLE 4

| CV: | MV: | |
|---|---|---|
| | MV01 | MV02 |
| CV01 | $G(s) = -50.4 \dfrac{1}{6.57s^2 + 7.32s + 1} e^{-2s}$ | $G(s) = 50.4 \dfrac{1}{4.28s + 1} e^{-0s}$ |
| CV02 | $G(s) = 1.48 \dfrac{1}{1.5s + 1} e^{-0s}$ | $G(s) = -1.48 \dfrac{1}{0.16s^2 + 0.8s + 1} e^{-0s}$ |
| CV03 | $G(s) = 21.4 \dfrac{0.67s + 1}{1.23s^2 + 2.78s + 1} e^{-0s}$ | $G(s) = -6 \dfrac{1}{0.4s + 1} e^{-0s}$ |
| CV04 | $G(s) = 21.4 \dfrac{0.67s + 1}{1.23s^2 + 2.78s + 1} e^{-0s}$ | $G(s) = -6 \dfrac{1}{0.4s + 1} e^{-0s}$ |
| CV05 | NULL | NULL |
| CV06 | $G(s) = 2.75 \dfrac{0.115s + 1}{0.69s^2 + 1.18s + 1} e^{-0s}$ | $G(s) = -2.75 \dfrac{1}{0.4s + 1} e^{-0s}$ |

TABLE 4-continued

| CV: | MV01 | MV02 |
|---|---|---|
| CV07 | $G(s) = 0.179 \dfrac{1}{1.5s^2 + s} e^{-12s}$ | $G(s) = -0.179 \dfrac{1}{0.8s^2 + s} e^{-12s}$ |
| CV08 | $G(s) = 0.179 \dfrac{1}{1.5s^2 + s} e^{-12s}$ | $G(s) = -0.179 \dfrac{1}{0.8s^2 + s} e^{-12s}$ |
| CV09 | $G(s) = 3.97 \dfrac{1}{1.5s^2 + 2.5s + 1} e^{-0s}$ | $G(s) = -3.97 \dfrac{1}{0.8s^2 + 1.8s + 1} e^{-1s}$ |
| CV10 | $G(s) = 3.97 \dfrac{1}{1.5s^2 + 2.5s + 1} e^{-0s}$ | $G(s) = -3.97 \dfrac{1}{0.8s^2 + 1.8s + 1} e^{-1s}$ |
| CV11 | $G(s) = 0.09 \dfrac{1}{1.61s^2 + 3s + 1} e^{-0s}$ | $G(s) = -0.09 \dfrac{1}{2.94s^2 + 4.9s + 1} e^{-0s}$ |
| CV12 | $G(s) = 38.9 \dfrac{1}{0.752s^2 + 2.35s + 1} e^{-0s}$ | $G(s) = -38.9 \dfrac{-0.187s + 1}{0.861s^2 + 1.34s + 1} e^{-0s}$ |
| CV13 | $G(s) = 60 \dfrac{1}{5s + s} e^{-30s}$ | $G(s) = -60 \dfrac{1}{5s + 1} e^{-30s}$ |
| CV14 | $G(s) = 28 \dfrac{1}{14.6s^2 + 7.64s + 1} e^{-0s}$ | $G(s) = -36.5 \dfrac{1}{0.446s^2 + 3.5s + 1} e^{-0s}$ |
| CV15 | $G(s) = 9.39 \dfrac{1}{50s^2 + 13s + 1} e^{-1s}$ | $G(s) = -9.39 \dfrac{1}{50s^2 + 13s + 1} e^{-1s}$ |
| CV16 | $G(s) = 8.32 \dfrac{1}{3s + 1} e^{-0s}$ | $G(s) = -8.32 \dfrac{1}{3s + 1} e^{-0s}$ |
| CV17 | $G(s) = 3.38 \dfrac{1}{4.32s^2 + 7.8s + 1} e^{-2s}$ | $G(s) = -3.38 \dfrac{1}{3s^2 + 5.6s + 1} e^{-0s}$ |
| CV18 | NULL | NULL |
| CV19 | NULL | NULL |
| CV20 | $G(s) = 4.3 \dfrac{1}{0.9s^2 + 2.6s + 1} e^{-11s}$ | $G(s) = 3.5 \dfrac{1}{10.5s^2 + 6.5s + 1} e^{-8s}$ |
| CV21 | $G(s) = 64.5 \dfrac{1}{10.8s^2 + 6.99s + 1} e^{-3s}$ | $G(s) = -9.28 \dfrac{2.78s + 1}{11s^2 + 2.74s + 1} e^{-0s}$ |
| CV22 | NULL | NULL |
| CV23 | NULL | NULL |
| CV24 | NULL | NULL |
| CV25 | NULL | NULL |
| CV26 | $G(s) = 0.018 \dfrac{1}{2.3s + 1} e^{-0s}$ | $G(s) = -0.018 \dfrac{1}{4.2s + 1} e^{-0s}$ |
| CV27 | $G(s) = -28.4 \dfrac{1}{12.1s^2 + 6.97s + 1} e^{-2s}$ | $G(s) = 28.4 \dfrac{1}{2.08s + 1} e^{-1s}$ |
| CV28 | $G(s) = 0.5 \dfrac{1}{3s + 1} e^{-0s}$ | $G(s) = -0.5 \dfrac{1}{2s + 1} e^{-0s}$ |
| CV29 | $G(s) = -30.8 \dfrac{1}{3s + 1} e^{-0s}$ | $G(s) = 30.8 \dfrac{1}{3s + 1} e^{-0s}$ |
| CV30 | $G(s) = 0.793 \dfrac{1}{2s + 1} e^{-0s}$ | $G(s) = -0.793 \dfrac{1}{2s + 1} e^{-0s}$ |
| CV31 | NULL | NULL |
| CV32 | $G(s) = 0.425 \dfrac{1}{10.1s^2 + 7.89s + 1} e^{-3s}$ | $G(s) = -0.425 \dfrac{1}{5.23s + 1} e^{-0s}$ |

TABLE 4-continued

| | MV: | |
|---|---|---|
| CV: | MV01 | MV02 |
| CV33 | $G(s) = -37.5\dfrac{1}{2.78s^2 + 3.33s + 1}e^{-2s}$ | $G(s) = 37.5\dfrac{1}{0.146s^2 + 2.2s + 1}e^{-0s}$ |
| CV34 | $G(s) = 1.95\dfrac{1}{11.8s^2 + 7.21s + 1}e^{-0s}$ | $G(s) = -1.2\dfrac{1}{4s + 1}e^{-1s}$ |
| CV35 | $G(s) = 4.69\dfrac{1}{7.39s^2 + 7.11s + 1}e^{-2s}$ | $G(s) = -4.69\dfrac{1}{5s + 1}e^{-0s}$ |
| CV36 | NULL | NULL |
| CV37 | NULL | NULL |
| CV38 | NULL | NULL |

TABLE 5

| | MV: | |
|---|---|---|
| CV: | MV03 | MV04 |
| CV01 | NULL | NULL |
| CV02 | NULL | NULL |
| CV03 | NULL | NULL |
| CV04 | NULL | NULL |
| CV05 | NULL | NULL |
| CV06 | NULL | NULL |
| CV07 | NULL | NULL |
| CV08 | NULL | NULL |
| CV09 | NULL | NULL |
| CV10 | NULL | NULL |
| CV11 | NULL | NULL |
| CV12 | NULL | NULL |
| CV13 | NULL | NULL |
| CV14 | NULL | $G(s) = 0.426\dfrac{53.6s + 1}{9.25s^2 + 5s + 1}e^{-0s}$ |
| CV15 | NULL | $G(s) = 9.5\dfrac{12s + 1}{70s^3 + 49s^2 + 12s + 1}e^{-1s}$ |
| CV16 | NULL | NULL |
| CV17 | NULL | NULL |
| CV18 | $G(s) = 3.76\dfrac{2.12s + 1}{1.14s^2 + 1.63s + 1}e^{-0s}$ | $G(s) = 13.7\dfrac{4.01s + 1}{4.29s^2 + 7.03s + 1}e^{-0s}$ |
| CV19 | NULL | $G(s) = 25.3\dfrac{1}{39.6s^2 + 14s + 1}e^{-5s}$ |
| CV20 | NULL | $G(s) = -10\dfrac{1}{20s^2 + 4s + 1}e^{-1s}$ |
| CV21 | NULL | $G(s) = -24.8\dfrac{1}{6.19s^2 + 8.27s + 1}e^{-0s}$ |
| CV22 | NULL | $G(s) = -14.5\dfrac{1}{20s^2 + 8s + 1}e^{-7s}$ |
| CV23 | NULL | $G(s) = -150\dfrac{1}{5s + 1}e^{-7s}$ |
| CV24 | NULL | $G(s) = 2.57\dfrac{-0.896s + 1}{15.6s^2 + 7.89s + 1}e^{-0s}$ |
| CV25 | NULL | $G(s) = -20.3\dfrac{1}{5.69s^2 + 4.77s + 1}e^{-3s}$ |
| CV26 | NULL | NULL |
| CV27 | NULL | NULL |
| CV28 | NULL | NULL |

TABLE 5-continued

| | MV: | |
|---|---|---|
| CV: | MV03 | MV04 |
| CV29 | NULL | NULL |
| CV30 | NULL | NULL |
| CV31 | NULL | NULL |
| CV32 | NULL | NULL |
| CV33 | NULL | NULL |
| CV34 | NULL | NULL |
| CV35 | NULL | NULL |
| CV36 | NULL | $G(s) = -1.5 \dfrac{1}{5s + 1} e^{-7s}$ |
| CV37 | NULL | NULL |
| CV38 | NULL | NULL |

TABLE 6

| | MV: | |
|---|---|---|
| CV: | MV05 | MV06 |
| CV01 | $G(s) = -0.22 \dfrac{1}{3s + 1} e^{-0s}$ | NULL |
| CV02 | NULL | NULL |
| CV03 | NULL | NULL |
| CV04 | NULL | NULL |
| CV05 | NULL | $G(s) = -0.65 \dfrac{1}{8s^3 + 6.6s^2 + 6s + 1} e^{-0s}$ |
| CV06 | NULL | NULL |
| CV07 | NULL | NULL |
| CV08 | NULL | NULL |
| CV09 | NULL | NULL |
| CV10 | NULL | NULL |
| CV11 | NULL | NULL |
| CV12 | NULL | NULL |
| CV13 | NULL | NULL |
| CV14 | $G(s) = 0.3 \dfrac{1}{3s + 1} e^{-0s}$ | NULL |
| CV15 | NULL | NULL |
| CV16 | NULL | NULL |
| CV17 | $G(s) = 0.0154 \dfrac{1}{1.8s^2 + 3.6s + 1} e^{-0s}$ | NULL |
| CV18 | NULL | NULL |
| CV19 | $G(s) = 0.8 \dfrac{1}{50s^2 + 12s + 1} e^{-2s}$ | NULL |
| CV20 | $G(s) = -0.4 \dfrac{1}{9s^2 + 6s + 1} e^{-0s}$ | NULL |
| CV21 | $G(s) = -1.1 \dfrac{1}{5s + 1} e^{-3s}$ | NULL |
| CV22 | $G(s) = -0.459 \dfrac{1}{7.94s^2 + 5.64s + 1} e^{-4s}$ | $G(s) = 1.5 \dfrac{1}{s + 1} e^{-0s}$ |
| CV23 | $G(s) = -1.28 \dfrac{1}{8s^2 + 6s + 1} e^{-3s}$ | $G(s) = 1.7 \dfrac{s + 1}{5s^2 + 2s + 1} e^{-0s}$ |
| CV24 | $G(s) = 0.0889 \dfrac{1}{6s + 1} e^{-0s}$ | NULL |

TABLE 6-continued

| CV: | MV05 | MV06 |
|---|---|---|
| CV25 | $G(s) = -0.4 \dfrac{1}{10s+1} e^{-0s}$ | NULL |
| CV26 | NULL | NULL |
| CV27 | NULL | NULL |
| CV28 | NULL | NULL |
| CV29 | NULL | NULL |
| CV30 | NULL | NULL |
| CV31 | NULL | NULL |
| CV32 | NULL | NULL |
| CV33 | NULL | NULL |
| CV34 | NULL | NULL |
| CV35 | $G(s) = 0.0214 \dfrac{1}{3s+1} e^{-0s}$ | NULL |
| CV36 | NULL | $G(s) = 0.0297 \dfrac{0.196s+1}{7.45s^2 + 2.36s + 1} e^{-0s}$ |
| CV37 | NULL | NULL |
| CV38 | $G(s) = 0.7 \dfrac{1}{10s^2 + 7s + 1} e^{-0s}$ | NULL |

TABLE 7

| CV: | MV07 | MV08 |
|---|---|---|
| CV01 | $G(s) = -1 \dfrac{1}{5s+1} e^{-0s}$ | NULL |
| CV02 | $G(s) = 0.022 \dfrac{6s+1}{5s^2 + 4s + 1} e^{-1s}$ | NULL |
| CV03 | $G(s) = 0.089 \dfrac{6s+1}{5s^2 + 4s + 1} e^{-5s}$ | NULL |
| CV04 | $G(s) = 0.089 \dfrac{6s+1}{5s^2 + 4s + 1} e^{-5s}$ | NULL |
| CV05 | NULL | NULL |
| CV06 | $G(s) = 0.409 \dfrac{10s+1}{6s^2 + 5s + 1} e^{-0s}$ | NULL |
| CV07 | $G(s) = 0.002 \dfrac{1}{0.8s^2 + s} e^{-12s}$ | $G(s) = 0.0851 \dfrac{1.29s+1}{0.484s^3 + 1.39s^2 + s} e^{-0s}$ |
| CV08 | $G(s) = 0.002 \dfrac{1}{0.8s^2 + s} e^{-12s}$ | $G(s) = 0.0851 \dfrac{1.29s+1}{0.484s^3 + 1.39s^2 + s} e^{-0s}$ |
| CV09 | $G(s) = 0.059 \dfrac{1}{0.8s^2 + 1.8s + 1} e^{-1s}$ | $G(s) = -2.55 \dfrac{1}{0.996s^2 + 2.97s + 1} e^{-0s}$ |
| CV10 | $G(s) = 0.059 \dfrac{1}{0.8s^2 + 1.8s + 1} e^{-1s}$ | $G(s) = -2.55 \dfrac{1}{0.996s^2 + 2.97s + 1} e^{-0s}$ |
| CV11 | $G(s) = 0.00133 \dfrac{1}{2.94s^2 + 4.95s + 1} e^{-0s}$ | NULL |
| CV12 | $G(s) = 0.57 \dfrac{-0.187s + 1}{0.861s^2 + 1.34s + 1} e^{-0s}$ | NULL |
| CV13 | $G(s) = 0.89 \dfrac{1}{5s+1} e^{-30s}$ | NULL |

TABLE 7-continued

| CV: | MV07 | MV08 |
|---|---|---|
| CV14 | $G(s) = 0.54 \dfrac{1}{1.35s + 1} e^{-0s}$ | NULL |
| CV15 | $G(s) = 0.139 \dfrac{1}{50s^2 + 13s + 1} e^{-1s}$ | NULL |
| CV16 | $G(s) = -0.6 \dfrac{10s + 1}{6s^2 + 6s + 1} e^{-0s}$ | NULL |
| CV17 | $G(s) = 0.0502 \dfrac{1}{3s^2 + 5.6s + 1} e^{-0s}$ | NULL |
| CV18 | NULL | NULL |
| CV19 | NULL | NULL |
| CV20 | $G(s) = 0.22 \dfrac{1.6s + 1}{7s^2 + 4s + 1} e^{-2.75s}$ | NULL |
| CV21 | $G(s) = -0.8 \dfrac{10s + 1}{18s^2 + 8s + 1} e^{-2s}$ | NULL |
| CV22 | NULL | NULL |
| CV23 | NULL | NULL |
| CV24 | $G(s) = 0.0498 \dfrac{1}{0.987s^2 + 2.05s + 1} e^{-0s}$ | NULL |
| CV25 | NULL | NULL |
| CV26 | $G(s) = 0.00027 \dfrac{1}{4.2s + 1} e^{-0s}$ | $G(s) = 0.000937 \dfrac{1}{0.4s + 1} e^{-0s}$ |
| CV27 | $G(s) = 0.422 \dfrac{1}{2s + 1} e^{-1s}$ | NULL |
| CV28 | $G(s) = 0.0074 \dfrac{1}{6s + 1} e^{-3s}$ | $G(s) = 0.00333 \dfrac{-0.605s + 1}{0.504s^2 + 0.882s + 1} e^{-0s}$ |
| CV29 | $G(s) = -0.46 \dfrac{1}{6s + 1} e^{-3s}$ | $G(s) = 0.533 \dfrac{1.3s + 1}{3.17s^2 + 4.17s + 1} e^{-0s}$ |
| CV30 | $G(s) = 0.012 \dfrac{1}{6s + 1} e^{-3s}$ | $G(s) = 0.00196 \dfrac{2.79s + 1}{0.496s^2 + 0.891s + 1} e^{-0s}$ |
| CV31 | NULL | $G(s) = -0.2 \dfrac{1}{3s + 1} e^{-0s}$ |
| CV32 | $G(s) = 0.0063 \dfrac{1}{4s + 1} e^{-0s}$ | NULL |
| CV33 | $G(s) = -0.56 \dfrac{1}{4s + 1} e^{-0s}$ | NULL |
| CV34 | $G(s) = -0.0147 \dfrac{15s + 1}{6s^2 + 7s + 1} e^{-0s}$ | NULL |
| CV35 | $G(s) = 0.0697 \dfrac{1}{9s + 1} e^{-0s}$ | NULL |
| CV36 | NULL | NULL |
| CV37 | $G(s) = 0.03 \dfrac{8s + 1}{30s^2 + 8s + 1} e^{-0s}$ | NULL |
| CV38 | $G(s) = 0.016 \dfrac{8s + 1}{11s^2 + 4s + 1} e^{-0s}$ | NULL |

Using these models 214, the controller 162 can effectively control the controlled variables through adjustments to the manipulated variables. The controller 162 can optimize the operation of the facility 100 using these models 214 and one or more economic optimization approaches. In some embodiments, the controller 162 is configured to use either linear program (LP) economics or quadratic program (QP) economics when controlling the facility 100. These two economic optimization approaches use a simple minimization strategy, although the quadratic optimization also uses ideal resting values (or desired steady state values). The economics can be defined to meet various objectives. These objectives could include:

provide a safe and stable operation;
maximize LNG production subject to constraints;
maximize NGL production subject to constraints;
maximize the JT valve position (such as 956);
maximize the absolute train pressure;
maintain the heavies removal distillation tower overhead temperature to less than 5° C. above the inlet temperature while maintaining the bottom temperature within limits;
maintain the temperature of the feed gas to the heavies removal column at a desired value;
maximize the valve position of the heavies removal distillation tower feed gas heat exchanger bypass;
maintain the de-ethanizer bottom C2/C3 ratio on specification; and
maximize the methane recycle valve position.

In this example, the yield of more valuable products (LNG and NGL) can be maximized using the LP and/or QP economics. Manipulated variables that can affect the yield (LNG versus NGL) can be pushed in an optimal combination to shift the yield in a favorable direction subject to operating and product quality limitations. Other optimal conditions can be achieved using the quadratic terms of the objective function.

In particular embodiments, the general form of an objective function could be:

$$\text{Minimize } J = \sum_i b_i \times CV_i + \sum_i a_i^2 (CV_i - CV_{0i})^2 + \sum_j b_j \times MV_j + \sum_j a_j^2 (MV_j - MV_{0j})^2,$$

where:
$b_i$ represents the linear coefficient of the $i^{th}$ controlled variable;
$b_j$ represents the linear coefficient of the $j^{th}$ manipulated variable;
$a_i$ represents the quadratic coefficient of the $i^{th}$ controlled variable;
$a_j$ represents the quadratic coefficient of the $j^{th}$ manipulated variable;
$CV_i$ represents the actual resting value of the $i^{th}$ controlled variable;
$CV_{0i}$ represents the desired resting value of the $i^{th}$ controlled variable;
$MV_j$ represents the actual resting value of the $j^{th}$ manipulated variable; and
$MV_{0j}$ represents the desired resting value of the $j^{th}$ manipulated variable.

As shown here, the optimization may involve a large number of process variables, each able to be incorporated into either a linear or quadratic optimization objective. The controller 162 can optimize the controlled variables using this optimization to meet various ones of the objectives described above.

Although FIG. 2 illustrates one example of a multi-variable controller 162 for a cascade liquefied natural gas facility, various changes may be made to FIG. 2. For example, the controller 162 could include any other or additional components according to particular needs.

Also, while shown as being formed using a computer processing device, the controller 162 could be implemented in any other suitable manner. In addition, the details provided above (such as the identification of particular controlled, manipulated, and disturbance variables and models 214) are examples only. The controller 162 could operate using any other suitable variables and/or models.

Figure 3B:
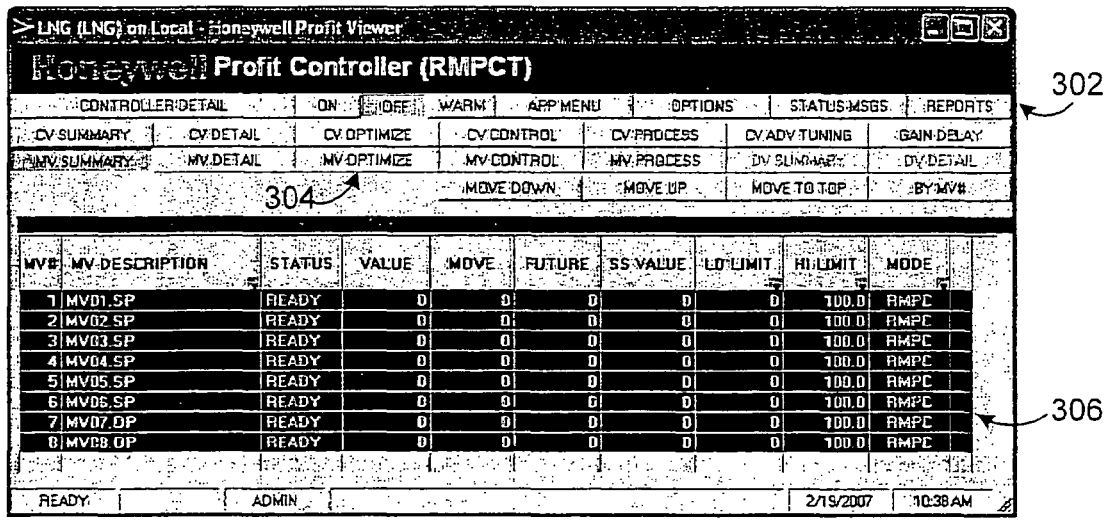
Figure 3A:
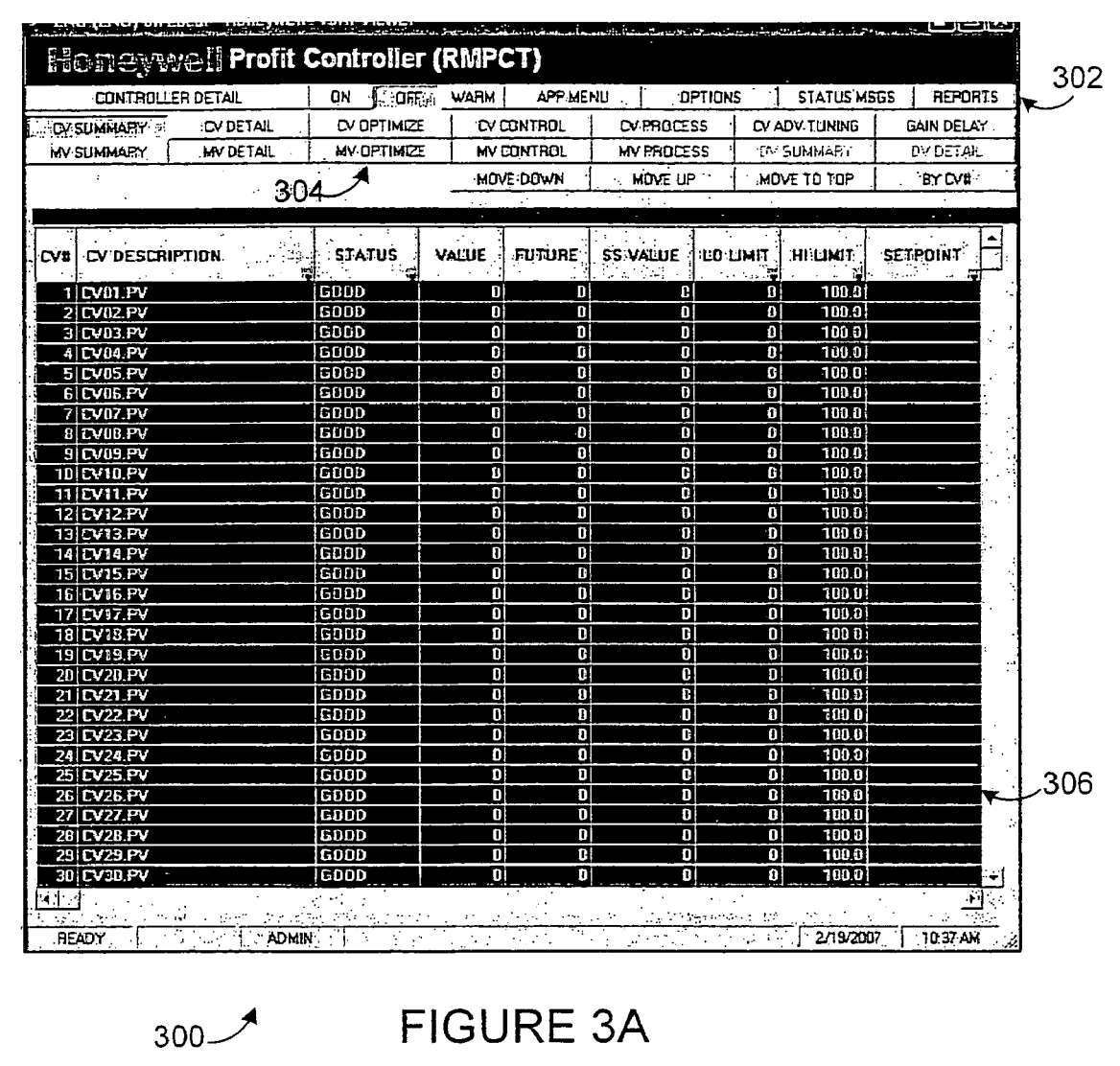

FIGS. 3A and 3B illustrate an example user interface 300 for controlling a cascade liquefied natural gas facility. The embodiment of the user interface 300 shown in FIGS. 3A and 3B are for illustration only. Other embodiments of the user interface 300 could be used without departing from the scope of this disclosure. Also, the user interface 300 may be provided by the controller 162 or any other suitable device or system.

The user interface 300 may support various functions performed or implemented by the controller 162. For example, the user interface 300 may allow a user to adjust operating parameters of different controlled variables, thereby allowing the user to adjust how the controller 162 is controlling the facility 100.

In this example, the user interface 300 includes control buttons 302, which allow the user to invoke various high-level functions related to the controller 162. In this example, the control buttons 302 allow the user to place the controller 162 in an on, off, or warm (predicting but non-controlling) state. The control buttons 302 also allow the user to view an application menu, set various high-level options, and view status messages or reports.

When the controller 162 is activated using the appropriate control button 302, function buttons 304 can be used to invoke particular functions by the user or to display particular information to the user. The information could, for example, be displayed in a display area 306 of the user interface 300. As shown in FIG. 3A, selection of the "CV Summary" button 304 allows the user to view and configure information associated with the controlled variables. For each controlled variable, the display area 306 includes a numerical index and a description. The display area 306 also includes the status of the controlled variable, indicating whether the controlled variable is being controlled ("good") or not ("drop"). The display area 306 further identifies a current value, a dynamic predicted future value, and a predicted steady-state (SS) value of the controlled variable. In addition, the display area 306 identifies low and high limits and a setpoint for the controlled variable. Using the user interface 300, the user could alter the low limit, high limit, or setpoint for one or more of the controlled variables. The controller 162 could then take this information into account when controlling the facility 100.

As shown in FIG. 3B, selection of the "MV Summary" button 304 allows the user to view and configure information associated with the manipulated variables. For each manipulated variable, the display area 306 includes a numerical index and a description. The display area 306 also includes the status of the manipulated variable, indicating whether the manipulated variable is being manipulated ("ready") or not ("serv"). The display area 306 further identifies a current value, a dynamic predicted future value, and a predicted steady-state (SS) value of the manipulated variable. Beyond that, the display area 306 identifies a calculated move or change in the setpoint of the manipulated variable. In addition, the display area 306 identifies low and high limits, a setpoint, and a mode of operation for the manipulated variable. The mode indicates whether the manipulated variable is being controlled manually ("OPR") or by the controller 162 ("RMPC"). Using the user interface 300, the user could alter the low limit, high limit, setpoint, or mode for one or more of the manipulated variables. The controller 162 could then take this information into account when controlling the facility 100.

Although FIGS. 3A and 3B illustrate one example of a user interface 300 for controlling a cascade liquefied natural gas facility, various changes could be made to FIGS. 3A and 3B. For example, any other or additional user interface could be used. Also, the arrangement and content of the user interface 300 shown in FIGS. 3A and 3B is for illustration only.

Figure 4:
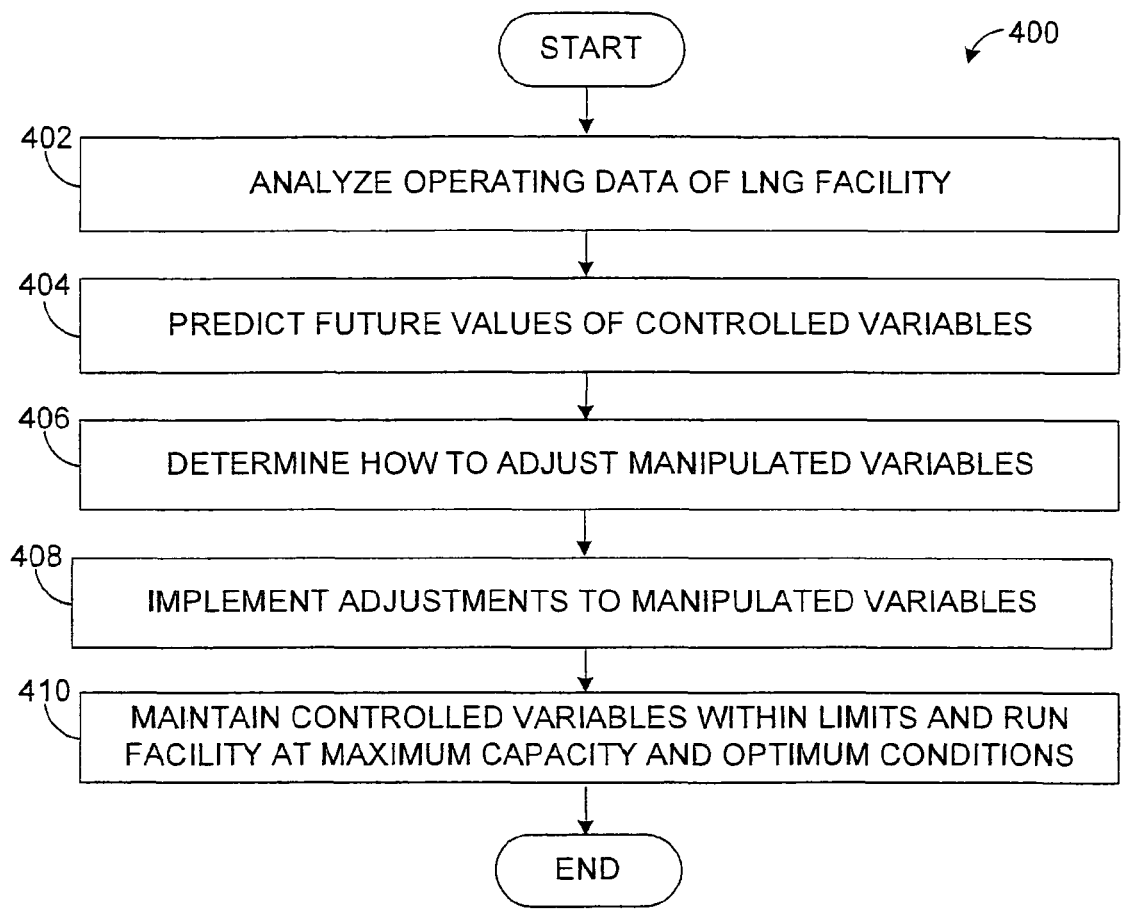
FIG. 4 illustrates an example method for controlling a cascade liquefied natural gas facility.

FIG. 4 illustrates an example method 400 for controlling a cascade liquefied natural gas facility. The embodiment of the method 400 shown in FIG. 4 is for illustration only. Other embodiments of the method 400 could be used without departing from the scope of this disclosure. Also, for ease of explanation, the method 400 is described with respect to the controller 162 controlling the cascade liquefied natural gas facility 100. The method 400 could be used by any device or system to control any suitable production system.

Operating data for the cascade liquefied natural gas facility is analyzed at step 402. This could include, for example, the controller 162 receiving data identifying how certain controlled, manipulated, and disturbance variables are behaving during operation of the cascade liquefied natural gas facility 100. The data could be stored in a database or other repository.

The controller predicts future values of the controlled variables at step 404. This may include, for example, the controller 162 analyzing past and current data regarding the controlled variables to estimate the future values of the controlled variables at some future point in time.

The controller determines how to adjust the manipulated variables at step 406. This may include, for example, the controller 162 using the models 214 to determine how to adjust the manipulated variables.

The controller implements the adjustments to the manipulated variables at step 408. This may include, for example, the controller 162 outputting control signals to adjust valves and other components in the facility 100. This can be done to alter valve positions, temperatures, flow rates, or other manipulated variables in the facility 100. These changes may have corresponding effects on the controlled variables being monitored in the facility 100.

In this way, the controller is able to maintain the controlled variables within their specified limits while also running the facility at maximum capacity and optimal operating conditions at step 410. This may include, for example, the controller 162 adjusting the manipulated variables so that the controlled variables stay within their limits. This may also include the controller 162 determining how to adjust the manipulated variables to optimize production of LNG and NGL products, which could be done using LP or QP economics.

Although FIG. 4 illustrates one example of a method 400 for controlling a cascade liquefied natural gas facility, various changes may be made to FIG. 4. For example, while shown as a series of steps, various steps in FIG. 4 could overlap. Also, various steps in FIG. 4 could be repeated, such as when the controller 162 performs steps 402-408 at a 30-second or other specified interval.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

SOFTWARE APPENDIX

COPYRIGHT HONEYWELL INTERNATIONAL INC.
Gain Multiplier Calc (CV35.CL)
------------------------------------------------------------------------------------
OBJECTIVE: THIS PROGRAM ALLOWS FOR SWITCHING OF
GAIN MULTIPLIER OF CV35 from 1 to 0 WHEN MV02 IS
WOUND UP. THIS IMPROVES THE PREDICTIONS OF CV35
BECAUSE MV02 DOES NOT AFFECT THIS CV WHEN IT IS
WOUND UP.
NOTE: The gain multiplier is based on the model index in the
model matrix. If off-line model changes are made in the MDL
file that result in the number of models changing (i.e.,
models added or removed), then the pointer index DTA (10) of
the model that is changed in this program must be updated.
------------------------------------------------------------------------------------
CDS DEFINITION
This section defines the CDSs used in MONITOR AM Point.
DTA.CL
DTA (1 . . . 10) Available number array to input shutdown conditions
DTA (1) = THRESHOLD FOR WINDUP DETECTION
DTA (2) = SMALLGAIN
DTA (3) = NORMALGAIN
DTA (10) = Model Index Pointer

SOFTWARE APPENDIX

```
BLOCK CV35 (POINT CV35; AT PRE_PVAG)
%RELAX LINKER_SDE_CHECKS

EXTERNAL MV02, TR1A_OGD
    PARAMETER DTA : ARRAY (1 . . . 10)
    LOCAL i
    SET i=DTA (10)
    IF (MV02.OP > DTA (1) AND TR1A_OGD.M(i) <>DTA
        (2) ) THEN
        & (SET TR1A_OGD.M (i) = DTA (2) ;
        & SET TR1A_OGD.C = 1.0)
    IF (MV02.OP <= DTA (1) AND TR1A_OGD.M (i) <>DTA
        (3) ) THEN
        & (SET TR1A_OGD.M (i) = DTA (3);
        & SET TR1A_OGD.C = 1.0)
L10: EXIT
END CV35
Gain Multiplier Calc (CV13.CL)

OBJECTIVE: THIS PROGRAM ALLOWS FOR SWITCHING OF
GAIN MULTIPLIER OF CV13 TO 1.0 ONCE C1511/21 RECYCLE
VALVES ARE > X %, AND TO 0.01 IF RECYCLE
VALVES < X %

CDS DEFINITION
This section defines the CDSs used in CV13 AM Point.
DTA.CL
DTA (1 . . . 10) Available number array to input shutdown conditions
DTA (1) = THRESHOLD
DTA (2) = SMALLGAIN
DTA (3) = NORMALGAIN
DTA (9) = Model Index Pointer for MV01
DTA (10) = Model Index Pointer for MV02

BLOCK CV13 (POINT CV13; AT PV_ALG)
%RELAX LINKER_SDE_CHECKS

EXTERNAL CV13OT, TR1ACV13, TR1A_OGD
    PARAMETER DTA : ARRAY(1 . . . 10)
    LOCAL i, j
    SET i = DTA (9)
    SET j = DTA (10)
    IF (CV13OT.PV < (TR1ACV13.N (2) - DTA (1))) AND
        (TR1A_OGD.M (i) <>DTA (2) OR TR1A_OGD.M
        (j) <>DTA (2)) THEN
        & (SET TR1A_OGD.M (i) = DTA (2);
        & SET TR1A_OGD.M (j) = DTA (2);
        & SET TR1A_OGD.C = 1.0)
    IF (CV13OT.PV >= (TR1ACV13.N (2) - DTA (1))) AND
        (TR1A_OGD.M(i) <>DTA (3) OR TR1A OGD.M
        (j) <>DTA (3)) THEN
        & (SET TR1A_OGD.M (i) = DTA (3);
        & SET TR1A_OGD.M (j) = DTA (3);
        & SET TR1A_OGD.C = 1.0)
L10: EXIT
END CV13
```

What is claimed is:

1. An apparatus comprising:
at least one memory configured to store at least one model, the at least one model associated with one or more manipulated variables and one or more controlled variables, the one or more manipulated variables and the one or more controlled variables associated with a cascade liquefied natural gas facility, one of the one or more controlled variables associated with an overall load placed on multiple refrigeration systems in the cascade liquefied natural gas facility; and
at least one processor configured to determine how to adjust the one or more manipulated variables using the at least one model so as to (i) maintain the one or more controlled variables within defined limits and (ii) increase the overall load placed on the refrigeration systems;
wherein the at least one processor is configured to determine how to adjust the one or more manipulated variables by identifying a maximum of: (i) a first projected feed gas rate to operate a propane refrigeration system at a propane maximum load, (ii) a second projected feed gas rate to operate an ethylene or ethane refrigeration system at an ethylene/ethane maximum load, and (iii) a third projected feed gas rate to operate a methane refrigeration system at a methane maximum load.

2. The apparatus of claim 1, wherein:
the cascade liquefied natural gas facility is operable to produce liquefied natural gas and natural gas liquids using raw feed gas; and
the at least one processor is configured to determine how to adjust the one or more manipulated variables so as to maximize a processing rate of the raw feed gas and to maximize a yield of the liquefied natural gas and the natural gas liquids.

3. The apparatus of claim 1, wherein the at least one processor is configured to determine how to adjust the one or more manipulated variables using one of: a linear program economic optimization and a quadratic program economic optimization.

4. The apparatus of claim 1, wherein the at least one processor is further configured to generate a user interface for presentation to a user and to receive input from the user, the input associated with a change to at least one of: a low limit value, a high limit value, and a setpoint associated with one of the controlled and manipulated variables.

5. The apparatus of claim 1, further comprising an interface configured to receive measurement data associated with the one or more controlled variables and to output control signals for adjusting the one or more manipulated variables.

6. A method comprising:
determining how to adjust one or more manipulated variables using at least one model, the one or more manipulated variables and one or more controlled variables associated with a cascade liquefied natural gas facility, one of the one or more controlled variables associated with an overall load placed on multiple refrigeration systems in the cascade liquefied natural gas facility; and
generating one or more control signals for the cascade liquefied natural gas facility, the one or more control signals adjusting operation of the cascade liquefied natural gas facility so as to (i) maintain the one or more controlled variables within defined limits and (ii) increase the overall load placed on the refrigeration systems;
wherein generating the one or more control signals comprises identifying a maximum of: (i) a first projected feed gas rate to operate a propane refrigeration system at a propane maximum load, (ii) a second projected feed gas rate to operate an ethylene or ethane refrigeration system at an ethylene/ethane maximum load, and (iii) a third projected feed gas rate to operate a methane refrigeration system at a methane maximum load.

7. The method of claim 6, wherein:
the cascade liquefied natural gas facility is operable to produce liquefied natural gas and natural gas liquids using raw feed gas; and
the one or more control signals maximize a processing rate of the raw feed gas and maximize a yield of the liquefied natural gas and the natural gas liquids.

8. The method of claim 6, wherein determining how to adjust the one or more manipulated variables comprises using one of: a linear program economic optimization and a quadratic program economic optimization.

9. The method of claim 6, further comprising:
presenting a user interface to a user; and
receiving input from the user, the input associated with a change to at least one of: a low limit value, a high limit value, and a setpoint associated with one of the controlled and manipulated variables;
wherein generating the one or more control signals comprises generating the one or more control signals based on at least one of: the low limit value, the high limit value, and the setpoint.

10. The method of claim 6, further comprising outputting the one or more control signals to the cascade liquefied natural gas facility.

11. The method of claim 6, wherein the one or more manipulated variables include at least one of:
a feed gas inlet pressure;
a drum inlet pressure in the methane refrigeration system;
a valve position of a feed gas heat exchanger bypass in the ethylene or ethane refrigeration system;
a feed gas temperature in the ethylene or ethane refrigeration system;
a stripping gas flow rate in the ethylene or ethane refrigeration system;
a reboiler temperature in the ethylene or ethane refrigeration system;
a valve position of a methane recycle flow controller in the methane refrigeration system; and
a valve position of a suction temperature controller in the ethylene or ethane refrigeration system.

12. The method of claim 6, wherein:
each of the refrigeration systems is associated with at least one compressor; and
generating the one or more control signals comprises determining a proximity of an overall compressor loading to a maximum compressor loading.

13. A computer readable medium embodying a computer program, the computer program comprising:
computer readable program code for determining how to adjust one or more manipulated variables using at least one model, the one or more manipulated variables and one or more controlled variables associated with a cascade liquefied natural gas facility, one of the one or more controlled variables associated with an overall load placed on multiple refrigeration systems in the cascade liquefied natural gas facility; and
computer readable program code for generating one or more control signals for the cascade liquefied natural gas facility, the one or more control signals configured to adjust operation of the cascade liquefied natural gas facility so as to (i) maintain the one or more controlled variables within defined limits and (ii) increase the overall load placed on the refrigeration systems;
wherein the computer readable program code for generating the one or more control signals comprises computer readable program code for identifying a maximum of: (i) a first projected feed gas rate to operate a propane refrigeration system at a propane maximum load, (ii) a second projected feed gas rate to operate an ethylene or ethane refrigeration system at an ethylene/ethane maximum load, and (iii) a third projected feed gas rate to operate a methane refrigeration system at a methane maximum load.

14. The computer readable medium of claim 13, wherein:
the cascade liquefied natural gas facility is operable to produce liquefied natural gas and natural gas liquids using raw feed gas; and
the one or more control signals are configured to maximize a processing rate of the raw feed gas and to maximize a yield of the liquefied natural gas and the natural gas liquids.

15. The computer readable medium of claim 13, wherein the computer readable program code for determining how to adjust the one or more manipulated variables comprises computer readable program code for using one of: a linear program economic optimization and a quadratic program economic optimization.

16. The computer program readable medium of claim 13, further comprising:
computer readable program code for presenting a user interface to a user; and
computer readable program code for receiving input from the user, the input associated with a change to at least one of: a low limit value, a high limit value, and a setpoint associated with one of the controlled and manipulated variables;
wherein the computer readable program code for generating the one or more control signals comprises computer readable program code for generating the one or more control signals based on at least one of: the low limit value, the high limit value, and the setpoint.

17. A method comprising:
determining how to adjust one or more manipulated variables using at least one model, the one or more manipulated variables and one or more controlled variables associated with a cascade liquefied natural gas facility, one of the one or more controlled variables associated with an overall compressor loading for multiple refrigeration systems in the cascade liquefied natural gas facility; and
generating one or more control signals for the cascade liquefied natural gas facility, the one or more control signals adjusting operation of the cascade liquefied natural gas facility so as to (i) maintain the one or more controlled variables within defined limits and (ii) increase the overall compressor loading;
wherein generating the one or more control signals comprises identifying a proximity of the overall compressor loading to a maximum load by identifying a largest of: (i) an amount of additional feed that can be processed in a propane refrigeration system up to a propane maximum load, (ii) an amount of additional feed that can be processed in an ethylene or ethane refrigeration system up to an ethylene/ethane maximum load, and (iii) an amount of additional feed that can be processed in a methane refrigeration system up to a methane maximum load.

18. The method of claim 17, wherein each amount of additional feed is determined by projecting a feed gas rate needed to operate one of the refrigeration systems at the maximum load for that refrigeration system.

19. The method of claim 17, wherein:
the cascade liquefied natural gas facility is operable to produce liquefied natural gas and natural gas liquids using raw feed gas; and
the one or more control signals maximize a processing rate of the raw feed gas and maximize a yield of the liquefied natural gas and the natural gas liquids.

20. The method of claim 17, wherein the one or more manipulated variables include at least one of:
a feed gas inlet pressure;
a drum inlet pressure in the methane refrigeration system;
a valve position of a feed gas heat exchanger bypass in the ethylene or ethane refrigeration system;

a feed gas temperature in the ethylene or ethane refrigeration system;

a stripping gas flow rate in the ethylene or ethane refrigeration system;

a reboiler temperature in the ethylene or ethane refrigeration system;

a valve position of a methane recycle flow controller in the methane refrigeration system; and a valve position of a suction temperature controller in the ethylene or ethane refrigeration system.

* * * * *